(12) United States Patent
Mesiti et al.

(10) Patent No.: US 7,779,712 B2
(45) Date of Patent: Aug. 24, 2010

(54) DOUBLE CLUTCH TRANSMISSION FOR A MOTOR VEHICLE

(75) Inventors: Domenico Mesiti, Orbassano (IT); Dario Caenazzo, Orbassano (IT)

(73) Assignee: CRF Societa Consortile per Azioni, Turin (IT)

( * ) Notice: Subject to any disclaimer, the term of this patent is extended or adjusted under 35 U.S.C. 154(b) by 433 days.

(21) Appl. No.: 11/612,949

(22) Filed: Dec. 19, 2006

(65) Prior Publication Data
US 2007/0204709 A1    Sep. 6, 2007

(30) Foreign Application Priority Data
Mar. 2, 2006   (EP) ................... 06425136

(51) Int. Cl.
*F16H 3/08* (2006.01)
(52) U.S. Cl. ............... 74/330; 74/333; 74/340
(58) Field of Classification Search ............ 74/340, 74/330, 333
See application file for complete search history.

(56) References Cited

U.S. PATENT DOCUMENTS

| | | | | |
|---|---|---|---|---|
| 7,219,571 B2 * | 5/2007 | McCrary | ............... | 74/335 |
| 7,246,536 B2 * | 7/2007 | Baldwin | ............... | 74/340 |
| 7,313,981 B2 * | 1/2008 | Gumpoltsberger | ........... | 74/340 |
| 7,314,427 B2 * | 1/2008 | Sakai et al. | ............ | 477/116 |
| 7,353,726 B2 * | 4/2008 | Beer et al. | ............ | 74/340 |
| 7,434,487 B2 * | 10/2008 | Terai | ............... | 74/330 |
| 7,437,963 B2 * | 10/2008 | Haka et al. | ............ | 74/329 |
| 7,467,564 B2 * | 12/2008 | Baldwin et al. | ......... | 74/337.5 |
| 7,472,617 B2 * | 1/2009 | Nicklass | ............ | 74/340 |
| 2003/0079953 A1 | 5/2003 | Carlson et al. | | |
| 2004/0035666 A1 | 2/2004 | Grosspietsch et al. | | |
| 2005/0262956 A1 | 12/2005 | Janson et al. | | |

FOREIGN PATENT DOCUMENTS

| | | |
|---|---|---|
| DE | 102 31 405 A1 | 2/2003 |
| EP | 1 544 505 A1 | 6/2005 |
| FR | 2 855 229 A1 | 11/2004 |

* cited by examiner

*Primary Examiner*—Ha D. Ho
(74) *Attorney, Agent, or Firm*—Sughrue Mion, PLLC

(57) ABSTRACT

The transmission comprises a gearbox having first and second input shafts coaxial to one another, wherein the second input shaft carries driving gearwheels associated to the even gears (second, fourth and sixth) and to the highest gear (sixth or seventh); and a clutch unit having first and second dry friction clutches arranged to couple a drive shaft of the motor vehicle respectively to the first and second input shafts of the gearbox. The first friction clutch associated to the first input shaft is normally disengaged, whereas the second friction clutch associated to the second input shaft is normally engaged.

4 Claims, 1 Drawing Sheet

# DOUBLE CLUTCH TRANSMISSION FOR A MOTOR VEHICLE

BACKGROUND OF THE INVENTION

The present invention relates to a double clutch transmission for a motor vehicle.

Document EP1544505 discloses a double clutch transmission with six forward gears for a motor vehicle, comprising a gearbox having a first input shaft carrying a plurality of driving gearwheels associated to the odd gears (first, third and fifth) and to the sixth gear, and a second input shaft carrying a plurality of driving gearwheels associated to the remaining even gears (second and fourth), and clutch unit suitable for selectively coupling a drive shaft of the motor vehicle for rotation with either one of the two input shafts of the gearbox. The clutch unit includes a first dry friction clutch associated to the first input shaft and a second dry friction clutch associated to the first input shaft. The first friction clutch is normally engaged, that is, configured to couple the drive shaft to the associated first input shaft of the gearbox when no external command is imparted, whereas the second friction clutch is normally disengaged, that is, configured to keep the drive shaft and the respective second input shaft of the gearbox uncoupled when no external command is imparted.

SUMMARY OF THE INVENTION

It is an object of the invention to provide a double clutch transmission with six or seven forward gears for a motor vehicle, in which the friction clutch unit has a reduced axial overall size and is properly arranged on the one hand to avoid damages to the gearbox and to prevent any danger situation for the driver, in case of breakdown to the transmission control system, and on the other hand to reduce to power consumption of the vehicle when it is running with the sixth gear engaged.

This and other objects are fully achieved according to the invention by virtue of a double clutch transmission with six or seven forward gears for a motor vehicle, comprising a gearbox having first and second input shafts coaxial to one another, and a clutch unit having a first normally-disengaged friction clutch arranged to couple a drive shaft of the motor vehicle to the first input shaft and a second normally-engaged friction clutch arranged to couple the drive shaft of the motor vehicle to the second input shaft, wherein the first is associated to the odd forward gears (first, third and fifth) while the second input shaft is associated to the even forward gears (second, fourth and sixth) and to the highest forward gear (sixth or seventh, respectively.

Further advantageous characteristics of the invention are defined in the dependent claims.

BRIEF DESCRIPTION OF THE DRAWINGS

The characteristics and the advantages of the invention will become apparent from the detailed description which follows, given purely by way of non-limiting example with reference to FIG. 1 of the appended drawings, which shows a longitudinal section of a double clutch transmission for a motor vehicle, in particular of a clutch unit of the transmission, according to a preferred embodiment of the invention.

DETAILED DESCRIPTION OF THE PREFERRED EMBODIMENTS

Figure 1:
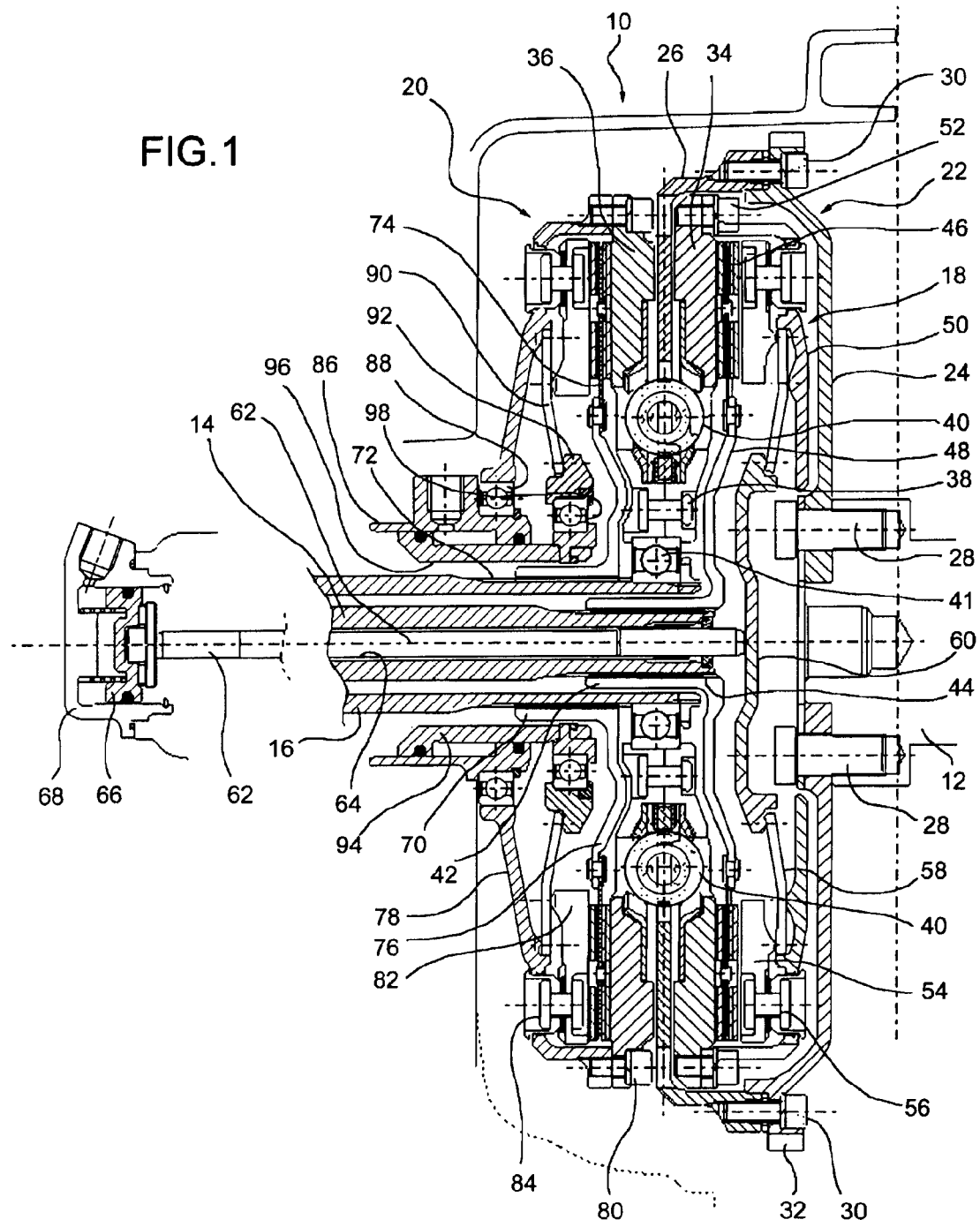

In the following description and claims, the terms "axial" or "longitudinal" are used to indicate a direction parallel to the axes of the shafts of the gearbox, whereas the terms "radial" or "transverse" are used to indicate a direction perpendicular to the said axial or longitudinal direction.

In FIG. 1 the reference numeral 10 generally indicates a clutch unit suitable for selectively coupling a drive shaft drive shaft 12 of the motor vehicle (of which only the end portion facing the gearbox is illustrated) for rotation with either one of two coaxial input shafts 14 and 16 (of which only the end portion facing the engine is illustrated) of a gearbox for a motor vehicle, in this case a six-gear gearbox.

The gearbox is neither described nor illustrated in detail here, since it is to be regarded as generally known to the person skilled in the art. What is worth pointing up here is that one of the two input shafts, in this case the inner input shaft 14, carries the driving gearwheels associated to the odd gears (first, third and fifth), whereas the other input shaft, in this case the outer input shaft 16, carries the driving gearwheels associated to the even gears (second, fourth and sixth).

The clutch unit 10 basically comprises a first normally-disengaged single-disc friction clutch 18 associated to the inner input shaft 14 and a second normally-engaged single-disc friction clutch 20 associated to the outer input shaft 16. Preferably, the two friction clutches 18 and 20 are dry friction clutches.

A double-mass flywheel, generally indicated 22, is axially interposed between the clutch unit 10 and the drive shaft 12.

The first mass of the flywheel 22 comprises a first element 24 facing the engine and a second element 26 facing the gearbox. The first element 24 is fixed at a radially inner portion thereof to the drive shaft 12 by means of screws 28 and at a radially outer portion thereof to the second element 26 by means of screws 30. The two elements 24 and 26 of the first mass of the flywheel 22 and the drive shaft 12 are therefore rigidly coupled for rotation with one another. However, as an alternative to a threaded connection between the two elements 24 and 26 of the first mass of the flywheel 22, a connection by means of splined profiles or ring gears could be provided. The first element 24 of the first mass of the flywheel 22 also has at its outer periphery a ring gear 32 arranged to mesh with a pinion of a starting electric motor (not illustrated).

The second mass of the flywheel 22 also comprises first and second disc-shaped elements 34 and 36, disposed on axially opposite sides of the second element 26 of the first mass and fixed to one another by means of screws 38. The second mass of the flywheel 22 is connected to the first mass, more specifically to the second element 26 of the first mass, through a torsional damper 40, preferably formed by a plurality of springs. The second mass del flywheel 22 is supported for rotation on the outer input shaft 16 of the gearbox by means of a radial ball bearing 41.

As will be better explained in the following part of the description, the two elements 34 and 36 of the second mass of the flywheel 22 act as abutment members of the normally-disengaged friction clutch 18 associated to the inner input shaft 14 and of the normally-engaged friction clutch 20 associated to the outer input shaft 16, respectively.

The normally-disengaged friction clutch 18 comprises a driven part rigidly connected for rotation with the inner input shaft 14 of the gearbox and a driving part connected for rotation to the drive shaft 16 through the flywheel 22. The driven part and the driving part of the friction clutch 18 are normally uncoupled for rotation with one another.

The driven part of the friction clutch 18 comprises a hub 42 arranged so as to slide axially on a splined end portion 44 of the inner input shaft 14 of the gearbox and a friction disc 46 rigidly connected for rotation with a flanged portion 48 of the hub 42. The driving part of the friction clutch 18 comprises, in addition to the abutment member 34 forming the first element of the second mass of the flywheel 22, a cap 50 fixed by means of screws 52 to the periphery of the abutment member 34 and extending radially inwards on the axially opposite side of the abutment member 34 with respect to the friction disc 46, and a pressure plate 54, which is interposed between the friction disc 46 and the cap 50 and is rigidly connected for rotation with this latter by means of tangential tabs 56.

The normally-disengaged friction clutch 18 further comprises:

- a disc spring 58 which is mounted on the outer periphery of a control plate 60, rests with a radially intermediate portion thereof against the cap 50 and can abut axially with a radially outer portion thereof against the pressure plate 54; and
- a control rod 62 which is slidably arranged in a coaxial cylindrical cavity 64 of the inner input shaft 14 of the gearbox and is actuated, for example by a hydraulic piston 66 received in a cavity formed by a casing portion 68 of the gearbox facing towards the opposite side with respect to the engine, to push the control plate 60 rightwards (with respect to an observer of FIG. 1).

When no command is imparted to the friction clutch 18 through the control rod 62, the radially outer portion of the disc spring 58 tends to remain detached from the pressure plate 54, while the radially inner portion tends to push the control plate 60, and therefore the control rod 62, leftwards. The friction disc 46 is not therefore pressed against the abutment member 34 and no torque is transmitted between the driving and driven parts of the friction clutch 18.

On the other hand, when the control rod 62 is pushed rightwards by the hydraulic piston 66, it pushes rightwards the radially inner portion of the disc spring 58 through the control plate 60. As a result, the radially outer portion of the disc spring 58 is pushed leftwards against the pressure plate 54, thereby clamping the friction disc 46 between the pressure plate 54 and the abutment member 34. The transmission of torque between the driving and driven parts of the friction clutch 18 is thus ensured.

The normally-engaged friction clutch 20 comprises a driven part rigidly connected for rotation with the outer input shaft 16 of the gearbox and a driving part connected for rotation to the drive shaft 16 through the flywheel 22. The driving and driven parts have a structure similar to the one described above with reference to the friction clutch 18, the only difference being that in this case they are normally coupled for rotation with one another.

The driven part of the friction clutch 20 comprises a hub 70 disposed so as to slide axially on a splined end portion 72 of the outer input shaft 16 of the gearbox and a friction disc 74 rigidly connected for rotation to a flanged portion 76 of the hub 70. The driving part of the friction clutch 20 comprises, in addition to the abutment member 36 forming the second element of the second mass of the flywheel 22, a cap 78 fixed by means of screws 80 to the periphery of the abutment member 36 and extending radially inwards on the axially opposite side of the friction disc 74 with respect to the abutment member 36 so as to divide the clutch unit 10 from the gearbox, and a pressure plate 82, which is interposed between the friction disc 74 and the cap 78 and is rigidly connected for rotation therewith by means of tangential tabs 84. The cap 78 is supported for rotation on a casing portion 86 of the gearbox by means of a radial ball bearing 88.

The normally-engaged friction clutch 20 further comprises:

- a disc spring 90 which is mounted on the outer periphery of a pressure plate 92, abuts with a radially intermediate portion thereof against the pressure plate 82 and rests with a radially outer portion thereof on the cap 78, so as to exert in a rest condition a rightward axial thrust (with respect to an observer of FIG. 1) tending to keep the friction disc 74 clamped between the pressure plate 82 and the abutment member 36; and
- a control hydraulic piston 94 defining with the casing portion 86 of the gearbox an annular space 96 suitable for being supplied with pressurized oil in order to cause the control piston 94 to move axially leftwards.

The pressure plate 92 is supported for rotation by a portion of the control hydraulic piston 94 by means of a radial ball bearing 98, but is rigidly connected for translation with the piston 94. In this way, when the control hydraulic piston 94 is caused to displace leftwards, it pulls with it the pressure plate 92 and therefore the radially inner portion of the disc spring 90, thereby causing the disengagement of the friction clutch 20.

The advantages of a clutch unit according to the invention can be summarized in the following points.

The use of dry clutches makes it possible to maximize the efficiency of the transmission with respect to the use of oil-bath clutches.

By virtue of the normally-engaged friction clutch being associated to the input shaft carrying the driving gearwheel corresponding to the highest gear (the sixth gear, in the illustrated embodiment), the power consumption of the motor vehicle when it runs with the highest gear engaged, for example, on a motorway, is reduced. No actuator, in fact, needs to be operated in order to ensure the engagement of the friction clutch intended to transmit the driving torque with the highest gear engaged.

Moreover, the normally-engaged friction clutch makes also possible to perform parking maneuvers in second gear without the need of a special parking device which on the other hand would be necessary with a clutch unit having both the friction clutches of the normally-disengaged type.

Since one of the two friction clutches is normally disengaged while the other is normally engaged, inconveniences, such as the breakage of one or more components of the gearbox, which might occur in case of failure of the transmission control system (be it an electric, an electronic and/or a hydraulic system) during the phase of the gear shift operation in which two gears are engaged at the same time, are also avoided without the need to use a special safety system which otherwise would be necessary with a clutch unit having both the friction clutches of the normally-engaged type.

A further advantage of the clutch unit according to the invention is that the forces necessary for actuating the two friction clutches are opposed to one another. The actuation force of the normally-disengaged friction clutch is in fact directed rightwards, whereas the actuation force of the normally-engaged friction clutch is directed leftwards. This clearly makes it possible to cancel the axial actuation loads, which are born by the bearing 41 of the second mass of the flywheel, when the two friction clutches are actuated at the same time during a gear shift operation, and therefore to increase the life time of this bearing.

Naturally, the principle of the invention remaining unchanged, the embodiments and details of construction could vary widely with respect to those described and illustrated purely by way of non-limiting example.

For example, even though a hydraulic system for actuating the two friction clutches is illustrated in the description and the figures, other different ways of actuation can clearly be provided, for example of electromechanical type.

Moreover, in a gearbox having six forward gears in which the driving gearwheels corresponding to the odd gears are arranged on the outer input shaft, instead of the inner one, and therefore the driving gearwheels corresponding to the even gears are arranged on the inner input shaft, instead of the outer one, it suffices to reverse the arrangement of the friction clutches shown in FIG. 1, that is, to associate the normally-engaged friction clutch to the inner input shaft and the normally-disengaged friction clutch to the outer input shaft.

Similar considerations apply to a gearbox with seven forward gears in which the driving gearwheel of seventh gear is arranged on the input shaft associated to the even gears.

What is claimed is:

1. A double clutch transmission with seven forward gears for a motor vehicle, comprising
    a gearbox having first and second input shafts coaxial to one another, and
    a clutch unit having a first normally-disengaged friction clutch arranged to couple a drive shaft of the motor vehicle to the first input shaft and a second normally-engaged friction clutch arranged to couple the drive shaft of the motor vehicle to the second input shaft, wherein the first input shaft is associated to the odd forward gears including first, third and fifth gears while the second input shaft is associated to the even forward gears including second, fourth and sixth gears and to the seventh forward gear.

2. The transmission of claim 1, wherein the first and second friction clutches are dry friction clutches.

3. The transmission of claim 1, wherein the first input shaft is arranged within the second input shaft.

4. The transmission of claim 1, wherein the second input shaft is arranged within the first input shaft.

* * * * *